United States Patent [19]

Denno et al.

[11] Patent Number: 5,287,067
[45] Date of Patent: Feb. 15, 1994

[54] METHOD AND APPARATUS FOR DEMODULATION WITH ADAPTIVE PHASE CONTROL IN QUASI-COHERENT DETECTION

[75] Inventors: Satoshi Denno; Yoichi Saito, both of Kanagawa, Japan

[73] Assignee: Nippon Telegraph and Telephone Corporation, Tokyo, Japan

[21] Appl. No.: 957,239

[22] Filed: Oct. 6, 1992

[51] Int. Cl.$^5$ .................... H04L 27/22; H04L 27/38
[52] U.S. Cl. .................... 329/304; 329/306; 329/341; 375/80
[58] Field of Search ............. 329/300, 304, 306, 341, 329/343, 310; 375/80, 82, 94, 96

[56] References Cited

U.S. PATENT DOCUMENTS

| | | | |
|---|---|---|---|
| 4,885,756 | 12/1989 | Fontanes et al. | 329/300 X |
| 4,968,955 | 11/1990 | Yoshida et al. | 329/304 |
| 5,097,220 | 3/1992 | Shimakata et al. | 329/306 |

FOREIGN PATENT DOCUMENTS 0355587  2/1990  European Pat. Off. .

OTHER PUBLICATIONS

Electronics and Communications in Japan, vol. 67-B, No. 5, 1984, New York US; J. Namiki: Block Demodulation for Short Radio Packet pp. 47-56.
Electronics and Communications in Japan, Part 1-Communications; vol. 74, No. 2, Feb. 1991, New York, pp. 28-35; M. Matsui et al.: New Block Demodulator with an Automatic Equalizer.
Electronics and Communications in Japan, Part I-Communications, vol. 72 No. 7, 1989, New York, Y. Higashida et al.: Timing Extraction and Carrier Estimation for PSK Signal Block Demodulation System.
IEEE Transactions On Information Theory, vol. 29, No. 4, Jul. 1983, New York, pp. 543-551; A. J. Viterbi/A. M. Viterbi: Nonlinear Estimation of PSK-Modulated Carrier Phase With Application to Burst Digital Transmission.
1988 IEEE International Symposium on Circuits and Systems ISCAS '88, 07.09.06.1988, Espoo, FI, vol. 2, pp. 1815-1818, IEEE, New York; P. Eglin et al. Digital Implementation of a Coherent CPM System for Mobile Radio.

*Primary Examiner*—Siegfried H. Grimm
*Attorney, Agent, or Firm*—Allegretti & Witcoff, Ltd.

[57] ABSTRACT

A method and an apparatus for demodulation with adaptive phase control in quasi-coherent detection, capable of compensating detection phase error due to the initial phase error and the frequency error at high speed and high quality, without a complicated circuit configuration and a significant delay. In the apparatus, a frequency error in the modulated complex input signals is estimated by using a phase variation during one symbol due to the frequency error according to the modulated complex input signals and the demodulated complex signals for present and immediately previous symbols; an initial phase error in the modulated complex input signals is estimated according to the modulated complex input signals, the demodulated complex signals, and the estimated frequency error; and the demodulated complex signals are obtained by applying optimum phase compensation determined according to the estimated frequency error and the estimated initial phase error, to the modulated complex input signals.

40 Claims, 14 Drawing Sheets

METHOD AND APPARATUS FOR DEMODULATION WITH ADAPTIVE PHASE CONTROL IN QUASI-COHERENT DETECTION

BACKGROUND OF THE INVENTION

1. Field of the Invention

The present invention relates to a quasi-coherent detection in which a quadrature detection of modulated input signals at a local oscillator frequency is made, and a phase compensation is made on baseband signals converted from the detected input signals.

2. Description of the Background Art

Conventionally, a quasi-coherent detection, in which the quadrature detection of the modulated input signals at a local oscillator frequency is made and the phase compensation is made on the baseband signals converted from the detected input signals, has been developed in the field of low speed data transmission. However, in recent years, due to the increasing speed of the digital circuits, there are cases in which the quasi-coherent detection is utilized for the high speed data transmission.

An example of a conventional quasi-coherent detection circuit for the high speed data transmission is disclosed in Ohtani et al. "Development of Digital MODEM LSI for Satellite Communications", Electronic Information Communication Society, Satellite Communication Study Session SAT88-7, pp.39-45, which has a configuration shown in FIG. 1. This configuration of FIG. 1 is basically a conventionally known carrier recovery circuit configuration implemented in terms of baseband range digital signals. In FIG. 1, a signal line for a complex quantity is indicated by a thick line, while a signal line for a scalar quantity is indicated by a thin line.

More specifically, in this circuit of FIG. 1, a carrier range complex multiplier 1 makes the quadrature detection of the modulated input signals S at a local frequency of a local oscillator 2, and after the noise components are removed by low pass filters 3, the detected input signals are converted into digital signals at A/D converters 4 and entered into a digital PLL (Phase Lock Loop) circuit 9.

At the digital PLL circuit 9, the phase rotation due to the frequency error is corrected at a digital complex multiplier 5. Then, the phase error is detected at a phase comparator 6, and the error voltage is integrated at a loop filter 7, so as to provide the feedback from a digital VCO (Voltage Controlled Oscillator) 8 to the digital complex multiplier 5.

Thus, in this quasi-coherent detection circuit, the acquisition time is determined by the time constant and the loop gain of the loop filter 7 which are the loop parameters of the digital PLL circuit 9.

In this configuration of FIG. 1, even though the high speed acquisition characteristic can be achieved by enhancing the noise band width, the quality of the demodulated signals can be deteriorated by such an enhancement of the noise band width.

Another example of a conventional quasi-coherent detection for the high speed data transmission is a block demodulation for the burst signals disclosed in Namiki, "Block Demodulation for Short Radio Packet", Electronic Information Communication Society Proceedings, "84/1, Vol. J67-B, No. 1, pp. 54-61, which can be implemented by a circuit configuration shown in FIGS. 2 and 3.

More specifically, in this circuit shown in FIG. 2, the quasi-coherent detection of modulated input signals S having N symbols for forming one burst is made by the carrier range complex multiplier 1, the local oscillator 2, the low pass filters 3, and the A/D converters 4, which are similar to those in the circuit of FIG. 1 described above.

Then, the carrier recovery is achieved by the averaging process using the power multiplication operations and the least square algorithm, where the total error including the initial phase error and the frequency error is estimated by using the least square algorithm, and the phase rotation is corrected according to the result of this estimation at a phase rotation correction estimation unit 10 shown in detail in FIG. 3.

Namely, in the phase rotation correction estimation unit 10 shown in FIG. 3, when the modulated input signals S are the M-array phase shift keying modulation signals, the tentatively demodulated signals U obtained at the A/D converters 4 are temporarily stored in a memory unit 11 shown in FIG. 2. Meanwhile, the modulation components are removed by multiplying the tentatively demodulated signals U for M times at an M-th power multiplication circuit 12-1. Then, the phase rotation is corrected at a digital complex multiplier 5-2 by calculating a complex multiplication of the beat components obtained by the M-th power multiplication circuit 12-1 and the correction signals for up to the immediately previous symbol multiplied for M times by another M-th power multiplication circuit 12-2. Then, the least square estimation value for the immediately previous symbol is corrected by the newly obtained estimation value at an estimation value correction circuit 13. Then, the estimation value for the n-th symbol is converted at a time series complex correction generation circuit 14 into the complex signals $Z = \exp[-j\{\theta_0 + \delta\omega(n-1)T\}]$ with the initial phase difference equal to $\theta_0$ and the frequency error equal to $\delta\omega(n-1)T$, where $\delta\omega$ is the frequency error and T is a symbol period.

Next, the tentatively demodulated signals U including the beat components which are stored in a memory circuit 11 are multiplied with the complex signals Z obtained by the phase rotation correction estimation unit 10 sequentially at a digital complex multiplier 5-1 to obtain the final demodulated signals.

However, this block demodulation requires a memory circuit with a memory capacity equal to the length of the burst, as well as many complex multipliers and adders, so that the circuit size inevitably becomes quite large.

In addition, a delay of at least one burst length is required in obtaining the final demodulated signals, so that it is not applicable to an application requiring the real time operation.

Another example of a conventional quasi-coherent detection for the high speed data transmission is a method for estimating the phase of the carrier by using the linear estimation, disclosed in Sampei, "QPSK Coherent Detection Method for Land Mobile Radio Communications Using Linear Mean Square Estimation", Electronic Information Communication Society B-II, Vol. J 72-B-II, No. 4, pp. 125-132.

However, even though this method can make the configuration of the circuit simpler, a steady state phase error occurs in a case involving a frequency error, so that the proper demodulation cannot be achieved in a case involving a frequency error in this method.

SUMMARY OF THE INVENTION

It is therefore an object of the present invention to provide a method and an apparatus for demodulation in quasi-coherent detection, capable of estimating and correcting the time variation of the detection phase error due to the initial phase error and the frequency error, at high speed, such that the proper demodulated signals can be obtained at high quality, without a complicated circuit configuration and a significant delay.

According to one aspect of the present invention there is provided a method of demodulation with adaptive phase control, for obtaining demodulated complex signals from modulated complex input signals, comprising the steps of: (a) estimating a frequency error in the modulated complex input signals by using a phase variation during one symbol due to the frequency error according to the modulated complex input signals and the demodulated complex signals obtained at the step (c) for present and immediately previous symbols; (b) estimating an initial phase error in the modulated complex input signals, according to the modulated complex input signals, the demodulated complex signals obtained at the step (c), and the frequency error estimated at the step (a); and (c) obtaining the demodulated complex signals by applying optimum phase compensation determined according to the frequency error estimated at the step (a) and the initial phase error estimated at the step (b), to the modulated complex input signals.

According to another aspect of the present invention there is provided an apparatus for demodulation with adaptive phase control, for obtaining demodulated complex signals from modulated complex input signals, comprising: (a) means for estimating a frequency error in the modulated complex input signals by using a phase variation during one symbol due to the frequency error according to the modulated complex input signals and the demodulated complex signals obtained by said means (c) for present and immediately previous symbols; (b) means for estimating an initial phase error in the modulated complex input signals, according to the modulated complex input signals, the demodulated complex signals obtained by said means (c), and the frequency error estimated by said means (a); and (c) means for obtaining the demodulated complex signals by applying optimum phase compensation determined according to the frequency error estimated by said means (a) and the initial phase error estimated by said means (b), to the modulated complex input signals.

Other features and advantages of the present invention will become apparent from the following description taken in conjunction with the accompanying drawings.

DETAILED DESCRIPTION OF THE PREFERRED EMBODIMENTS

Figure 1:
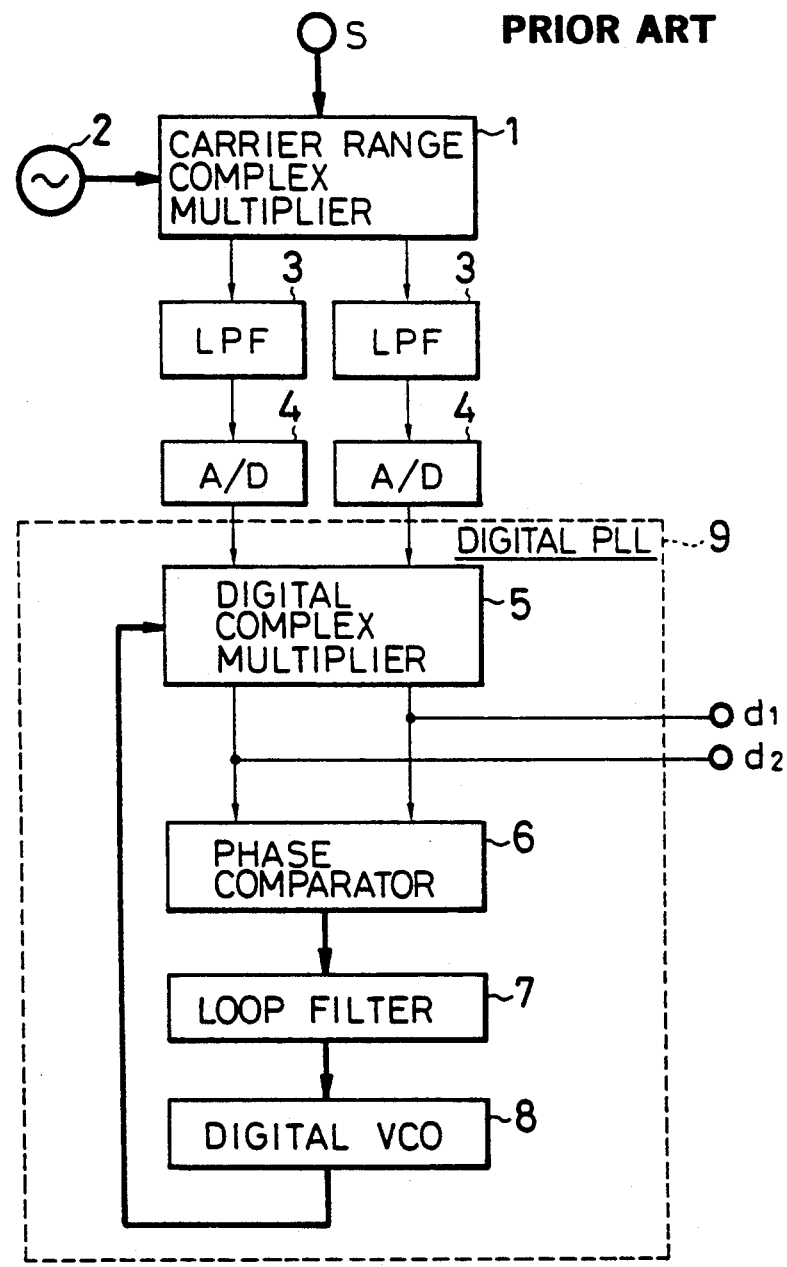
FIG. 1 is a block diagram of a first example of a conventional quasi-coherent detection circuit for the high speed data transmission.
Figure 2:
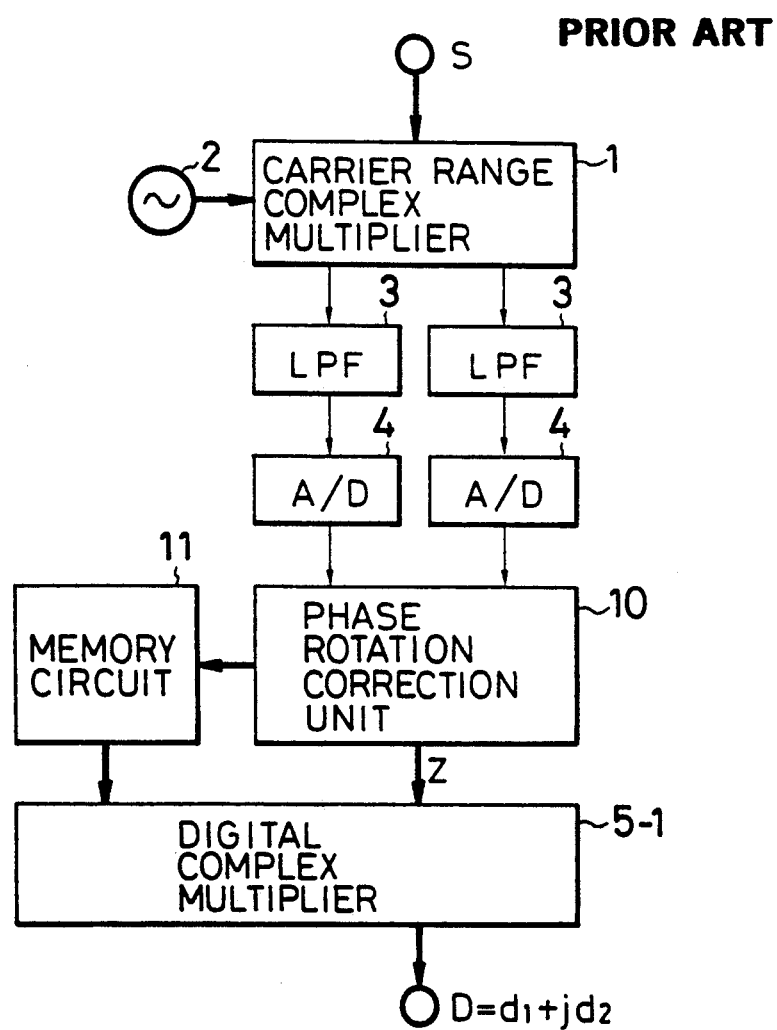
FIG. 2 is a block diagram of a second example of a conventional quasi-coherent detection circuit for the high speed data transmission.
Figure 3:
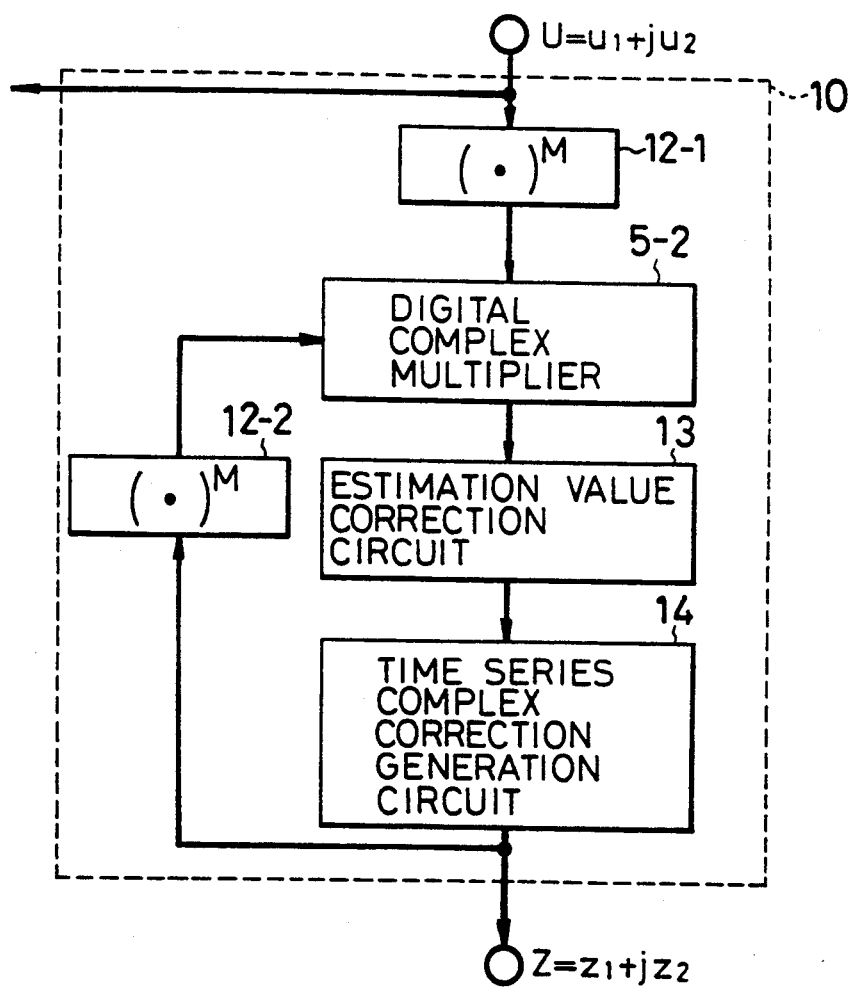
FIG. 3 is a detailed block diagram of a phase rotation correction estimation unit in the conventional quasi-coherent detection circuit shown in FIG. 2.
Figure 4:
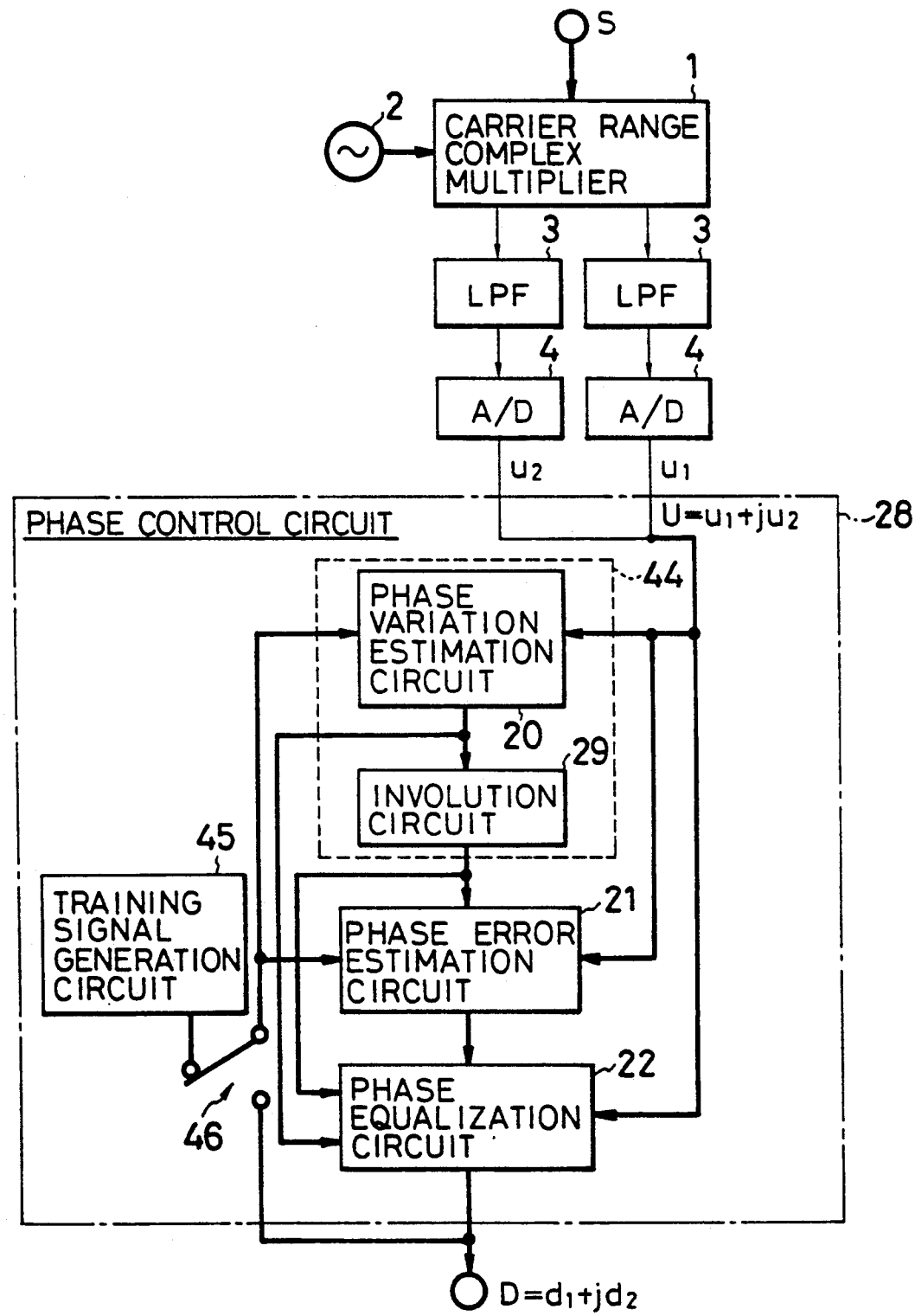
FIG. 4 is a block diagram of a first embodiment of an apparatus for demodulation with adaptive phase control in quasi-coherent detection, according to the present invention.

Referring now to FIG. 4, a first embodiment of an apparatus for demodulation with adaptive phase control in quasi-coherent detection according to the present invention will be described in detail. In the following, a signal line for a complex quantity is indicated by a thick line, while a signal line for a scalar quantity is indicated by a thin line.

In this apparatus of FIG. 4, modulated input signals S having a central frequency equal to $f_0$ are to be demodulated to obtain demodulated complex signals $D = d_1 + jd_2$, where $j^2 = -1$ and $d_1$ denotes in-phase signals while $d_2$ denotes quadrature signals.

This apparatus of FIG. 4 includes: a carrier range complex multiplier 1, a local oscillator 2, low pass filters 3, and A/D converters 4, which are similar to those used in the conventional quasi-coherent detection apparatus described above.

Thus, the carrier range complex multiplier 1 makes the quadrature detection of the modulated input signals S at a local frequency $f_0 + \Delta f$ of the local oscillator 2, and the noise and higher harmonic components are removed at low pass filters 3, and then the detected input signals are converted into digital signals $u_1$ and $u_2$ at A/D converters 4, where the digital signals $u_1$ and $u_2$ form tentatively demodulated signals $U = u_1 + ju_2$ with $u_1$ as in-phase components and $u_2$ as quadrature components.

The tentatively demodulated signals U in a form of a series of sampled values generated at symbol periods are then supplied to a phase control circuit 28 in which all the processings are carried out digitally.

The phase control circuit 28 comprises: a phase error estimation circuit 21, a phase equalization circuit 22, a frequency compensation circuit 44, a training signal generation circuit 45, and a switching circuit 46, which realizes a Wiener filter as a whole.

The frequency compensation circuit 44 further comprises: a phase variation estimation circuit 20 and an involution circuit 29, and functions to make an estimation for phase compensation required by a frequency error in the tentatively demodulated signals U.

The phase variation estimation circuit 20 estimates the phase variation due to the frequency error by using RLS (Recursive Least Square) algorithm in the tentatively demodulated signals U entered from the A/D converters 4, and outputs the obtained phase variation estimation to the involution circuit 29.

The phase error estimation circuit 21 estimates the initial phase error due to the frequency error by using RLS (Recursive Least Square) algorithm in the tentatively demodulated signals U entered from the A/D converters 4, according to the output of the involution circuit 29.

The phase equalization circuit 22 makes the phase equalization in the tentatively demodulated signals U entered from the A/D converters 4, according to the outputs of the phase variation estimation circuit 20, the involution circuit 29, and the phase error estimation circuit 21, to obtain the demodulated complex signals D.

The training signal generation circuit 45 generates the training signals to be used in the phase variation estimation circuit 20 and the phase error estimation circuit 21, and the switching circuit 46 selectively supplies either the training signals generated by the training signal generation circuit 45 or the demodulated complex signals D outputted by the phase equalization circuit 22 to the phase variation estimation circuit 20 and the phase error estimation circuit 21. When the frequency error in the tentatively demodulated signals U is large, the switching circuit 46 initially selects the training signals from the training signal generation circuit 45, and then subsequently switches to the demodulated complex signals D from the phase equalization circuit 22 later on. The training signal generation circuit 45 and the switching circuit 46 may be omitted if desired.

Figure 5:
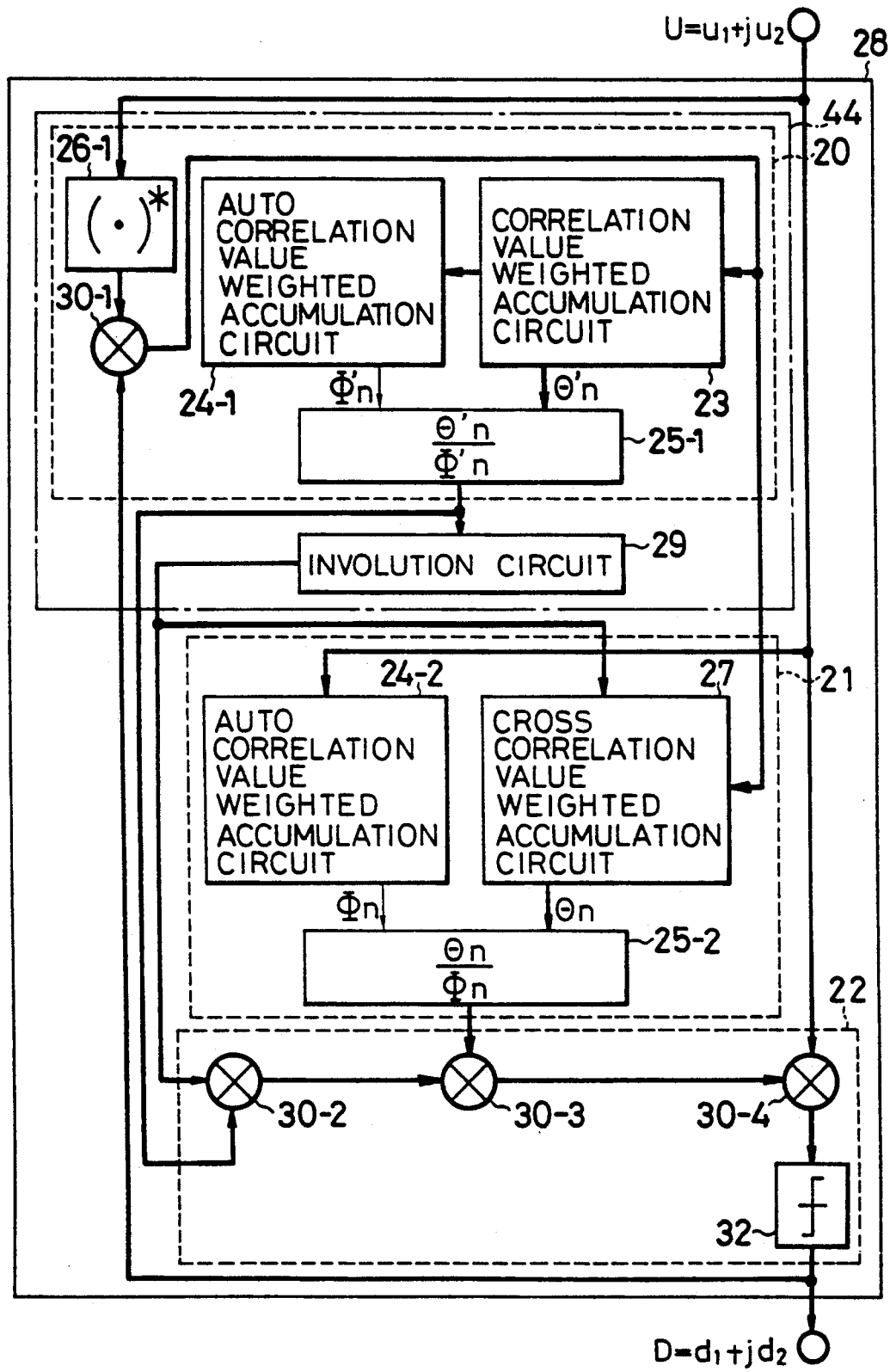
FIG. 5 is a detailed block diagram of a phase control circuit in the apparatus of FIG. 4.

In further detail, for a case of using the RLS algorithm for 16 QAM (Quadrature Amplitude Modulation) and not using the training signals, the phase control circuit 28 has a configuration as shown in FIG. 5.

In this configuration of FIG. 5, the phase variation estimation circuit 20 in the frequency compensation circuit 44 further comprises: a complex conjugation circuit 26-1 for taking a complex conjugation of the tentatively demodulated signals U; a complex multiplier 30-1 for calculating a cross correlation value of the complex conjugate of the tentatively demodulated signals U obtained at the complex conjugation circuit 26-1 and the demodulated complex signals D outputted from the phase equalization circuit 22; a correlation value weighted accumulation circuit 23 to be described below; an auto correlation value weighted accumulation circuit 24-1 to be described below; and a divider 25-1 to be described below. Here, the cross correlation value is taken at the complex multiplier 30-1 in order to remove the modulation components and leave the beat components in the tentatively demodulated signals U.

Figure 6:
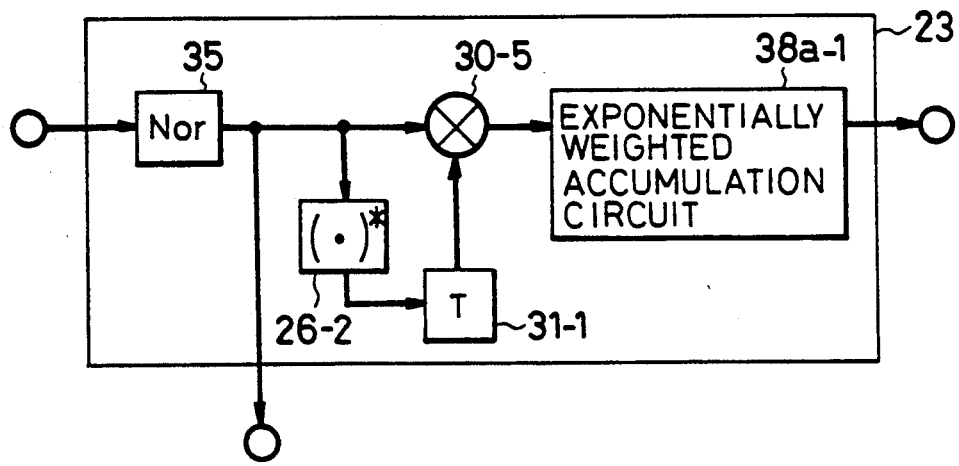
FIG. 6 is a detailed block diagram of a correlation value weighted accumulation circuit in the phase control circuit of FIG. 5.

The correlation value weighted accumulation circuit 23 in the phase variation estimation circuit 20 functions to normalize the correlation value obtained by the complex multiplier 30-1, detect the variation during one symbol, and calculate the accumulation value of the detected variations weighted by a forgetting factor $\lambda_1$, and has a detail configuration as shown in FIG. 6.

In this configuration of FIG. 6, the correlation value weighted accumulation circuit 23 comprises: a complex normalization circuit 35 for normalizing the correlation value obtained by the complex multiplier 30-1; a complex conjugation circuit 26-2 for taking a complex conjugate of the normalized correlation value obtained by the complex normalization circuit 35; a delay circuit 31-1 for delaying the complex conjugate obtained by the complex conjugation circuit 26-2 for one symbol period; a complex multiplier 30-5 for multiplying the normalized correlation value obtained by the complex normalization circuit 35 and the delayed complex conjugate outputted from the delay circuit 31-1, so as to obtain the variation during one symbol; and an exponentially weighted accumulation circuit 38a-1 for calculating the exponentially weighted accumulation value $\Theta'_n$ of the variations obtained by the complex multiplier 30-5.

The normalized correlation value obtained by the complex normalization circuit 35 is also outputted to the auto correlation value weighted accumulation circuit 24-1, while the exponentially weighted accumulation value $\Theta'_n$ calculated by the exponentially weighted accumulation circuit 38a-1 is outputted to the divider 25-1.

Figure 7:
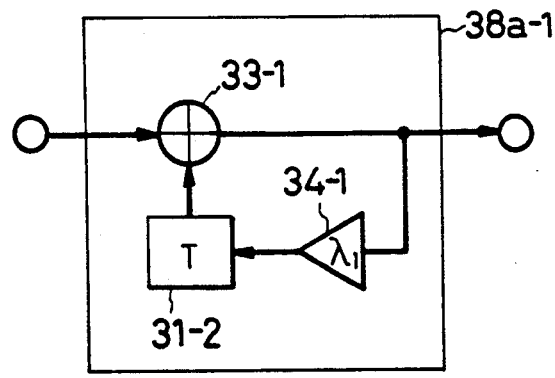
FIG. 7 is a detailed block diagram of an exponentially weighted accumulation circuit in the correlation value weighted accumulation circuit of FIG. 6.

The exponentially weighted accumulation circuit 38a-1 further comprises, as shown in FIG. 7, an adder 33-1, a weight circuit 34-1 for weighting an output of the adder 33-1 with the foregetting factor $\lambda_1$, and a delay circuit 31-2 for delaying the weighted output obtained by the weight circuit 34-1 for one symbol period and supplying it to the adder 33-1 such that the adder 33-1 adds the output of the complex multiplier 30-5 and the delayed output supplied from the delay circuit 31-2.

Figure 8:
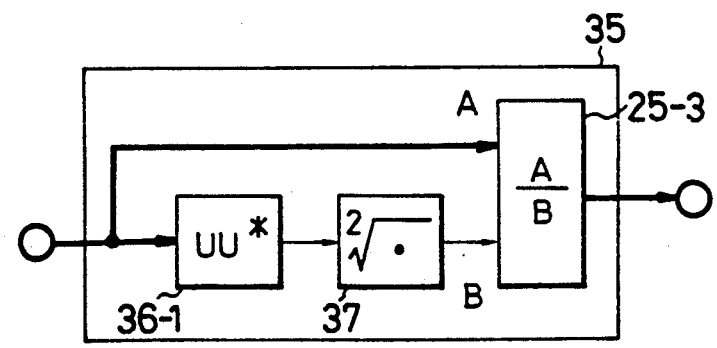
FIG. 8 is a detailed block diagram of a complex normalization circuit in the correlation value weighted accumulation circuit of FIG. 6.

The complex normalization circuit 35 further comprises, as shown in FIG. 8, a complex square multiplication circuit 36-1 for calculating a complex square multiplication of the input denoted as A in FIG. 8, a square root circuit 37 for calculating a square root of the complex square multiplication calculated by the complex square multiplication circuit 36-1 which is denoted as B in FIG. 8, and a divider 25-3 for dividing the input A by the square root of the complex square multiplication B, so as to obtain the absolute value of the input A.

Figure 9:
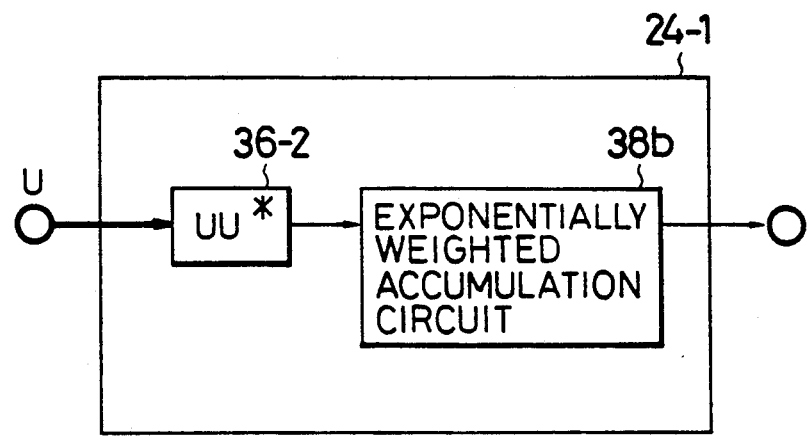
FIG. 9 is a detailed block diagram of an auto correlation value weighted accumulation circuit in the phase control circuit of FIG. 5.

On the other hand, the auto correlation value weighted accumulation circuit 24-1 in the phase variation estimation circuit 20 functions to calculate the accumulation value of the normalized correlation value supplied from the complex normalization circuit 35 weighted by a foregetting factor $\lambda_2$ which may be equal to the foregetting factor $\lambda_1$, and has a detail configuration as shown in FIG. 9.

In this configuration of FIG. 9, the auto correlation value weighted accumulation circuit 24-1 comprises: a complex square multiplication circuit 36-2 for calculating a complex square multiplication of the normalized correlation value supplied from the complex normalization circuit 35; and an exponentially weighted accumulation circuit 38b for calculating the exponentially weighted accumulation value $\Phi'_n$ of the complex square multiplication obtained by the complex square multiplication circuit 36-2. The exponentially weighted accumulation value $\Phi'_n$ calculated by the exponentially weighted accumulation circuit 38b, which is a scalar quantity, is outputted to the divider 25-1.

Figure 10:
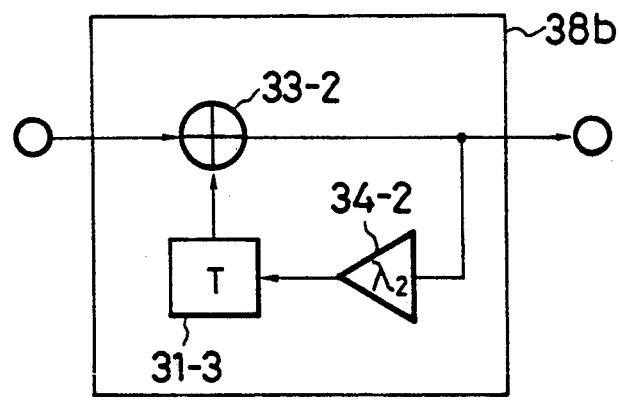
FIG. 10 is a detailed block diagram of an exponentially weighted accumulation circuit in the auto correlation value weighted accumulation circuit of FIG. 9.

The exponentially weighted accumulation circuit 38b further comprises, as shown in FIG. 10, an adder 33-2, a weight circuit 34-2 for weighting an output of the adder 33-2 with the forgetting factor $\lambda_2$, and a delay circuit 31-3 for delaying the weighted output obtained by the weight circuit 34-2 for one symbol period and supplying it to the adder 33-2 such that the adder 33-2 adds the output of the complex square multiplication circuit 36-2 and the delayed output supplied from the delay circuit 31-3.

Then, the divider 25-1 in the phase variation estimation circuit 20 divides the exponentially weighted accumulation value $\Theta'_n$ supplied from the correlation value weighted accumulation circuit 23 by the exponentially weighted accumulation value $\Phi'_n$ supplied from the auto correlation value weighted accumulation circuit 24-1. The output $\Theta'_n/\Phi'_n$ obtained by the divider 25-1, which indicates the phase variation estimation, is then supplied to the involution circuit 29 as well as to the phase equalization circuit 22.

In this phase variation estimation circuit 20, the variation during one symbol obtained by the complex multiplier 30-5 in the correlation value weighted accumulation circuit 23 is proportional to the frequency error in the tentatively demodulated signals U for that one symbol, and the phase variation estimation obtained by the divide 25-1 indicates an ensemble average of the phase variations during one symbol in the tentatively demodulated signals U.

Figure 11:
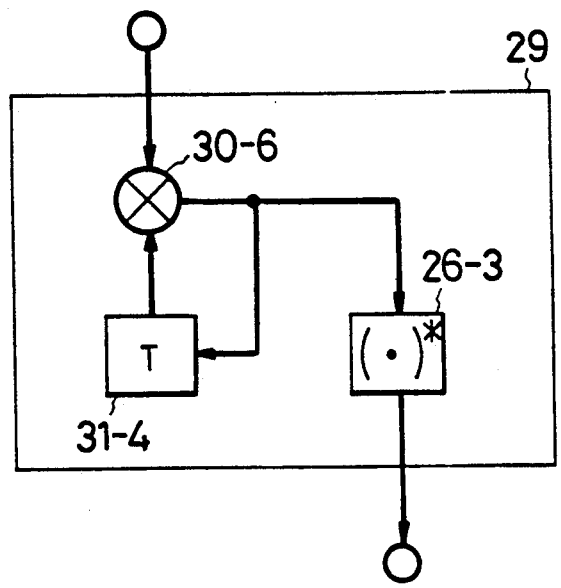
FIG. 11 is a detailed block diagram of an involution circuit in the phase control circuit of FIG. 5.

The involution circuit 29 in the frequency compensation circuit 44 calculates the involution of the output $\Theta'_n/\Phi'_n$ outputted by the divider 25-1 to obtain the total phase variation for the n-th symbol, which is taken as the estimation of phase compensation required by a frequency error, and has a detail configuration as shown in FIG. 11.

In this configuration of FIG. 11, the involution circuit comprises: a complex multiplier 30-6, a delay circuit 31-4 for delaying an output of the complex multiplier 30-6 for one symbol period such that the complex multiplier 30-6 multiplies the output $\Theta'_n/\Phi'_n$ supplied from the divider 25-1 by itself, and a complex conjugation circuit 26-3 for taking the complex conjugate of the output of the complex multiplier 30-6 so as to obtain the involution. The involution obtained by the involution circuit 29, which indicates the estimation of phase compensation required by a frequency error, is then supplied to the phase error estimation circuit 21 as well as to the phase equalization circuit 22.

Now, the frequency error estimated by the frequency compensation circuit 44 does not account for the initial phase error. In particular, in a case of mobile communication, the phase variation can be caused by the Rayleigh fading, even when the frequency error is equal to zero. For this reason, it is further necessary to make an estimation for the initial phase error, in order to be able to compensate the variation due to such an initial phase error. To this end, the phase during one burst in the burst signal transmission is assumed to be stationary even under the Rayleigh fading. In other words, the initial phase error is estimated as an ensemble average of the mean phase errors between the input and the output.

In the configuration of FIG. 5, this function is realized by the phase error estimation circuit 21, which further comprises: a cross correlation value weighted accumulation circuit 27, an auto correlation value weighted accumulation circuit 24-2, and a divider 25-2.

Figure 12:
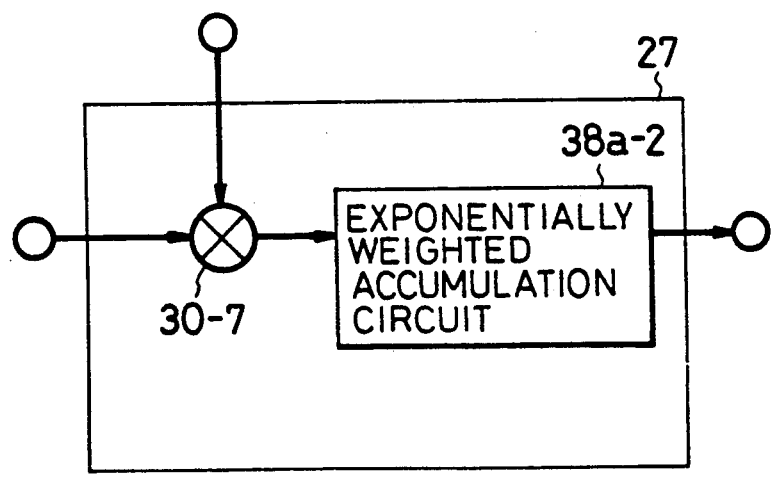
FIG. 12 is a detailed block diagram of a cross correlation value weighted accumulation circuit in the phase control circuit of FIG. 5.

The cross correlation value weighted accumulation circuit 27 in the phase error estimation circuit 21 functions to calculate the cross correlation value of the correlation value obtained by the complex multiplier 30-1 and the involution obtained by the involution circuit 29, and then calculate the accumulation value of the cross correlation values weighted by the forgetting factor $\lambda_1$, and has a detail configuration as shown in FIG. 12.

In this configuration of FIG. 12, the cross correlation value weighted accumulation circuit 27 comprises: a complex multiplier 30-7 for multiplying the correlation value outputted from the complex multiplier 30-1 and the involution outputted from the involution circuit 29 so as to obtain the cross correlation value; and an exponentially weighted accumulation circuit 38a-2 for calculating the exponentially weighted accumulation value $\Theta_n$ of the cross correlation values obtained by the complex multiplier 30-7, which has a substantially similar configuration as that shown in FIG. 7 described above.

On the other hand, the auto correlation value weighted accumulation circuit 24-2 in the phase error estimation circuit 21 functions to calculate the accumulation value of the tentatively demodulated signals U entered into the phase control circuit 28 weighted by the forgetting factor $\lambda_2$, and has a detail configuration which is substantially similar to that shown in FIG. 9 described above.

The exponentially weighted accumulation value $\Phi_n$ calculated by the exponentially weighted accumulation circuit 38b in this auto correlation value weighted accumulation circuit 24-2, which is a scalar quantity, is outputted to the divider 25-2.

Then, the divider 25-2 in the phase error estimation circuit 21 divides the exponentially weighted accumulation value $\Theta_n$ supplied from the cross correlation value weighted accumulation circuit 27 by the exponentially weighted accumulation value $\Phi_n$ supplied from the auto correlation value weighted accumulation circuit 24-2. The output $\Theta_n/\Phi_n$ obtained by the divider 25-2, which indicates the initial phase error estimation, is then supplied to the phase equalization circuit 22.

Finally, in the configuration of FIG. 5, the phase equalization circuit 22 further comprises: three complex multipliers 30-2, 30-3, and 30-4; and a decision circuit 32. In this phase equalization circuit 22, the phase equalization in the tentatively demodulated signals U entered into the phase control circuit 28 is made as follows. First, a complex multiplication of the phase variation estimation outputted from the phase variation estimation circuit 20, the estimation of phase compensation required by the frequency error outputted from the involution circuit 29, and the initial phase error estimation outputted from the phase error estimation circuit 21, is calculated at the complex multipliers 30-2 and 30-3, so as to determine the optimum phase compensation for the tentatively demodulated signals U. Then, a complex multiplication of the tentatively demodulated signals U entered into the phase control circuit 28 and the determined optimum phase compensation is calculated at the complex multiplier 30-4 to make the optimum phase compensation on the tentatively demodulated signals U. Lastly, the decision of the digital signal values in the optimally phase compensated and tentatively demodulated signals U obtained at the complex multiplier 30-4 is made by the decision circuit 32 to obtain the demodulated complex signals D.

In summary, the operation in the phase control circuit 28 in this first embodiment proceeds as follows.

First, at the phase variation estimation circuit 20, the correlation value of the tentatively demodulated signals U and the demodulated complex signals D is calculated at the complex multiplier 30-1, and the phase variation during one symbol due to the frequency error is estimated. Then, according to this phase variation estimation, the phase compensation required by the frequency error is estimated at the involution circuit 29.

Next, at the phase error estimation circuit 21, the initial phase error is estimated according to the phase compensation estimated at the frequency compensation circuit 44.

Next, at the phase equalization circuit 22, a complex multiplication of the phase variation estimation obtained at the phase variation estimation circuit 20 and the estimation of phase compensation obtained at the involution circuit 29 is calculated at the complex multiplier 30-2 to obtain the estimated phase compensation due to the frequency error, and then a complex multiplication of this estimated phase compensation due to the frequency error and the initial phase error estimation obtained at the phase error estimation circuit 21 is calculated at the complex multiplier 30-3 to determine the optimum phase compensation. Then, the determined optimum phase compensation is made on the tentatively demodulated signals U at the complex multiplier 30-4, so that the demodulated complex signals D are obtained at the decision circuit 32 according to these optimally phase compensated and tentatively demodulated signals U obtained at the complex multiplier 30-4.

It is to be noted that this first embodiment of an apparatus for quasi-coherent detection with adaptive phase control is also applicable to a case of the multi-level modulation.

In addition, when this first embodiment is applied to a case of the PSK (Phase Shift Keying) modulation, because the input signal level at the Nyquist point is constant in such a case, the normalization for the input of the auto correlation value weighted accumulation circuit 24-1 can be omitted.

As described, in this first embodiment, the adaptive phase control is achieved at the phase control circuit 28 by estimating the frequency error according to the variation during one symbol in the cross correlation value of the input and the output of the phase control circuit 28, and then estimating the initial phase error according to the frequency error estimation, using a Wiener filter configuration in which the input is weighted by complex weights and a mean square value of a difference between the weighted input and a desired signal is made minimum, where the demodulated complex signals are used as the desired signal in the embodiment described above. The training signals generated by the training signal generation circuit 45 shown in FIG. 4 may be used as the desired signal instead.

Now, in general, in order to estimate the detection phase error by using a Wiener filter and to recursively obtain the desirable (in a sense that the mean square value of the error becomes minimum) demodulated signals by correcting the tentatively demodulated signals, it is possible to utilize the RLS (Recursive Least Square) algorithm which uses a complex multiplication of the input and a complex signal (least square estimation value) obtained as S1/S2, where S1 is a signal obtained by accumulating the cross correlation values of the input and the desired signal weighted by the forgetting factor, and S2 is a signal obtained by accumulating the auto correlation values of the input weighted by the same forgetting factor, as disclosed in Japanese Patent Application No. 3-160672.

Here, in order for this RLS algorithm to be applicable, it is necessary to have the stationariness established, i.e., the average value of the error signals must be equal to zero as in a case of the differential detection. However, in a case of the quasi-coherent detection, the stationariness cannot be established because of the presence of the time variation of the detected phase error, i.e., the frequency error between carriers, so that the steady state phase error remains after the correction deduced by the RLS algorithm.

In order to circumvent this difficulty, the estimation of the phase variation during one symbol in the cross correlation value is made at the phase variation estimation circuit 20, because the phase variation due to the frequency error is equal to the variation during one symbol in the cross correlation value of the input and the demodulated output. Then, the phase error due to the frequency error is obtained by calculating the involution of the estimated phase variation, and the initial phase error is estimated after the effect of the frequency error is removed from the input by multiplying the input with the phase error at the phase error estimation circuit 21. Finally, the estimation of phase compensation required by the frequency error for the next symbol is obtained by calculating a complex multiplication of the phase compensation required by the estimated frequency error and the current phase variation estimation, and the optimum phase compensation for the next symbol is obtained by calculating a complex multiplication of the estimation of phase compensation and the initial phase error estimation.

Thus, the method used in this first embodiment significantly differs from the conventionally known methods in that the steady state phase error due to the frequency off-set can be removed completely by carrying out the phase equalization with the phase variation due to the frequency error taken into account, where the frequency error is estimated from the variation in the cross correlation value of the input and the desired signals.

Figure 13:
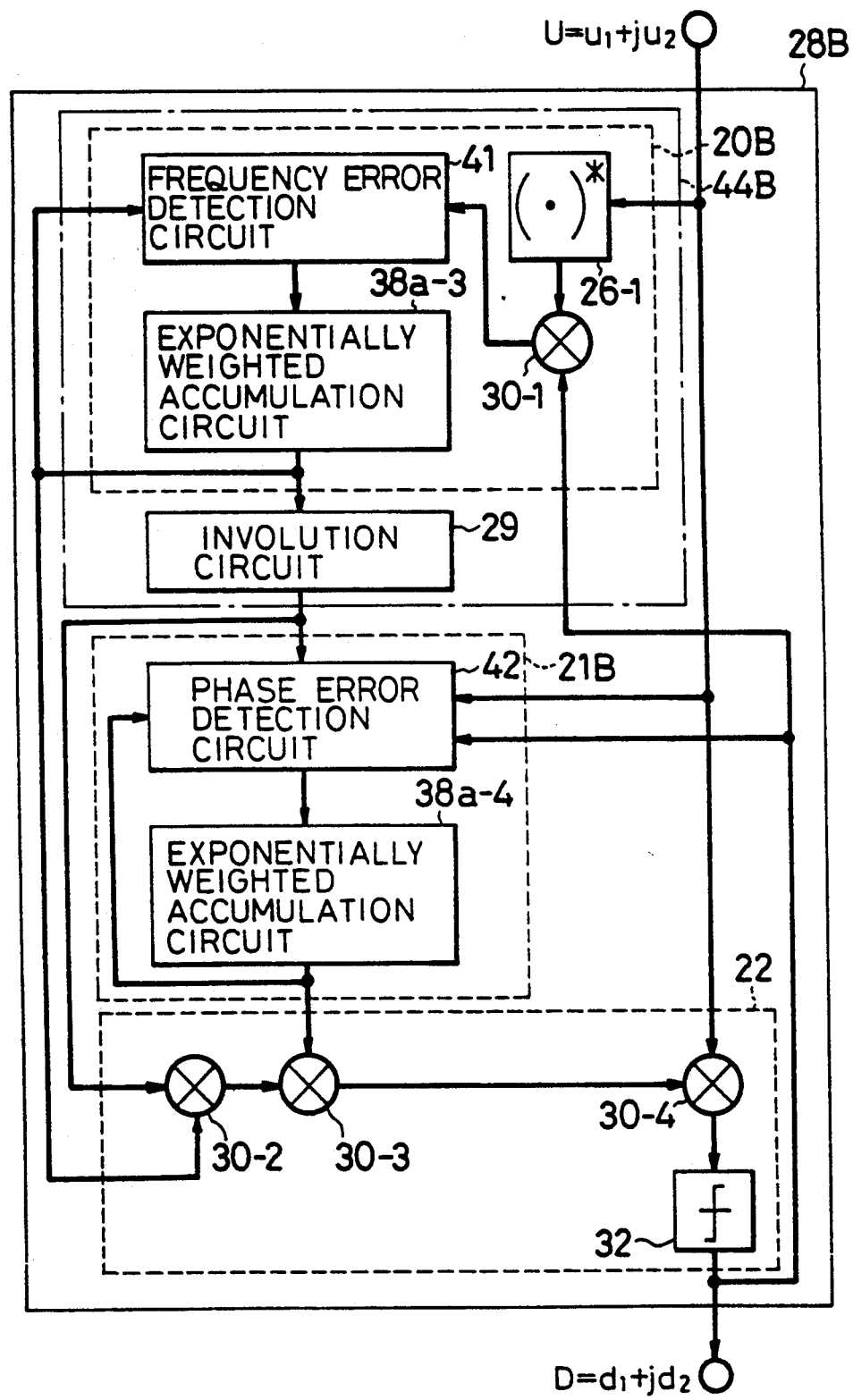
FIG. 13 is a detailed block diagram of a phase control circuit in a second embodiment of an apparatus for demodulation with adaptive phase control in quasi-coherent detection, according to the present invention.

Referring now to FIG. 13, a second embodiment of an apparatus for demodulation with adaptive phase control in quasi-coherent detection according to the present invention will be described in detail. Here, those elements which are substantially equivalent to the corresponding elements in the first embodiment described above will be given the same reference numerals in the figures, and their description will be omitted.

This second embodiment is a modification of the first embodiment described above in which the LMS (Least Mean Square) algorithm is utilized in the phase control circuit instead of the RLS algorithm.

Although not shown in FIG. 13, in which second embodiment, modulated input signals S having a central frequency equal to $F_0$ are to be demodulated to obtain demodulated complex signals $D = d_1 + jd_2$, where $j^2 = -1$ and $d_1$ denotes in-phase signals while $d_2$ denotes quadrature signals.

Accordingly, the apparatus of this second embodiment also includes: a carrier range complex multiplier 1, a local oscillator 2, low pass filters 3, and A/D converters 4, which are similar to those appearing in the first embodiment shown in FIG. 4 described above.

In this second embodiment, the phase control circuit 28B comprises: a frequency compensation circuit 44B, a phase error estimation circuit 21B, a phase equalization circuit 22 similar to that used in the first embodiment, which also realizes a Wiener filter as a whole.

The frequency compensation circuit 44B further comprises: a phase variation estimation circuit 20B, and an involution circuit 29 similar to that used in the first embodiment, and functions to make an estimation of phase compensation required by a frequency error by using the LMS algorithm.

The phase variation estimation circuit 20B estimates the phase variation due to the frequency error by using LMS algorithm in the tentatively demodulated signals U entered into the phase control circuit 28B, and outputs the obtained phase variation estimation to the involution circuit 29.

The phase error estimation circuit 21B estimates the initial phase error due to the frequency error by using LMS algorithm in the tentatively demodulated signals U entered into the phase control circuit 28B according to the output of the involution circuit 29.

In further detail, the phase variation estimation circuit 20B in the frequency compensation circuit 44B further comprises: a complex conjugation circuit 26-1 and a complex multiplier 30-1 similar to those used in the first embodiment; a frequency error detection circuit 41; and an exponentially weighted accumulation circuit 38a-3 similar to that shown in FIG. 7 used in the first embodiment.

Figure 14:
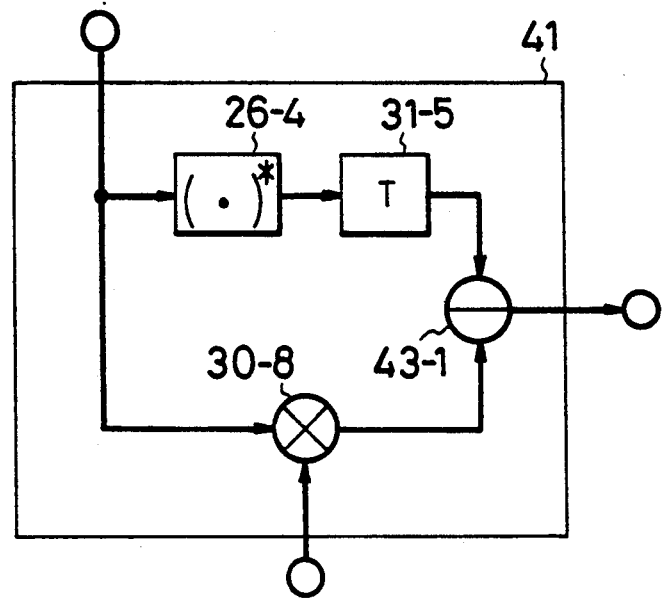
FIG. 14 is a detailed block diagram of a frequency error detection circuit in the phase control circuit of FIG. 13.

The frequency error detection circuit 41 in the phase variation estimation circuit 20B functions to detect the phase variation during one symbol, and has a detail configuration as shown in FIG. 14.

In this configuration of FIG. 14, the frequency error detection circuit 41 comprises: a complex conjugation circuit 26-4 for taking a complex conjugate of the cross correlation value obtained by the complex multiplier 30-1; a delay circuit 31-5 for delaying the complex conjugate obtained by the complex conjugation circuit 26-4 for one symbol period; a complex multiplier 30-8 for multiplying the cross correlation value obtained by the complex multiplier 30-1 and the output of the frequency error detection circuit 41; and a subtractor 43-1 for subtracting the output of the complex multiplier 30-8 from the delayed complex conjugate outputted from the delay circuit 31-5 so as to obtain the variation during one symbol.

Then, the exponentially weighted accumulation circuit 38a-3 calculates the exponentially weighted accumulation value of the variations obtained by the subtractor 43-1, which is subsequently outputted to the involution circuit 29 and the complex multiplier 30-2 in the phase equalization circuit 22, while also fed back to the complex multiplier 30-8 of the frequency error detection circuit 41.

The involution circuit 29 calculates the involution of the exponentially weighted accumulation value obtained by the exponentially weighted accumulation circuit 38a-3 to obtain the estimation of phase compensation required by a frequency error, which is subsequently supplied to the phase error estimation circuit 21B as well as to the complex multiplier 30-2 in the phase equalization circuit 22.

Also, in the configuration of FIG. 13, the phase error estimation circuit 21B further comprises: a phase error detection circuit 42, and an exponentially weighted accumulation circuit 38a-4 similar to that shown in FIG. 7 used in the first embodiment.

Figure 15:
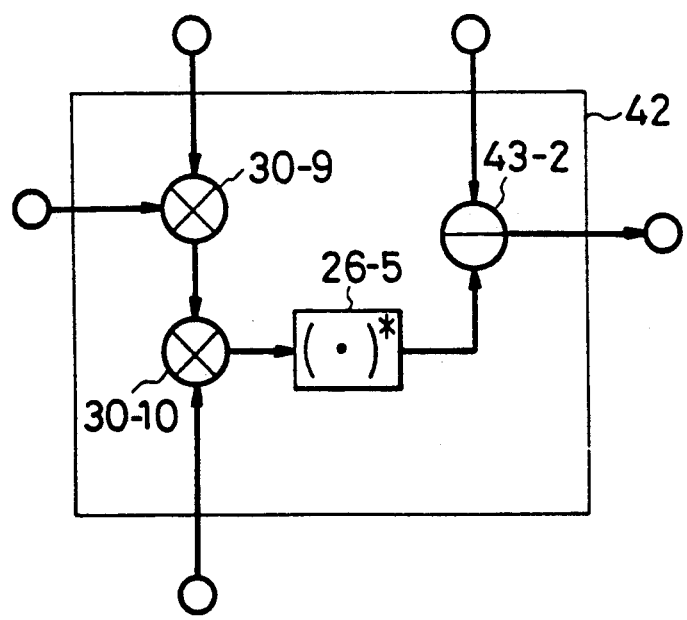
FIG. 15 is a detailed block diagram of a phase error detection circuit in the phase control circuit of FIG. 13.

The phase error detection circuit 42 in the phase error estimation circuit 21B functions to detect the initial phase error according to the estimated frequency error, and has a detail configuration as shown in FIG. 15.

In this configuration of FIG. 15, the phase error detection circuit 42 comprises: a complex multiplier 30-9 for multiplying the tentatively demodulated signals U and the involution obtained by the involution circuit 29; a complex multiplier 30-10 for multiplying the output of the complex multiplier 30-9 and the output of the phase error detection circuit 42; a complex conjugation circuit 26-5 for taking the complex conjugate of the output of the complex multiplier 30-10; and a subtractor 43-2 for subtracting the complex conjugate obtained by the complex conjugation circuit 26-5 from the demodulated complex signals D outputted from the phase equalization circuit 22 to obtain the initial phase error.

Then, the exponentially weighted accumulation circuit 38a-4 calculates the exponentially weighted accumulation value of the initial phase error obtained by the subtractor 43-2, which is subsequently outputted to the complex multiplier 30-3 in the phase equalization circuit 22, while also fed back to the complex multiplier 30-10 of the phase error detection circuit 42.

In summary, the operation in the phase control circuit 28B in this second embodiment proceeds, just as in the first embodiment described above, as follows.

First, at the phase variation estimation circuit 20B, the correlation value of the tentatively demodulated signals U and the demodulated complex signals D is calculated at the complex multiplier 30-1, and the phase variation during one symbol due to the frequency error is estimated. Then, according to this phase variation estimation, the phase compensation required by the frequency error is estimated at the involution circuit 29.

Next, at the phase error estimation circuit 21B, the initial phase error is estimated according to the phase variation and the phase compensation estimated at the frequency compensation circuit 44B.

Next, at the phase equalization circuit 22, a complex multiplication of the phase variation estimation obtained at the phase variation estimation circuit 20B and the estimation of phase compensation obtained at the involution circuit 29 is calculated at the complex multiplier 30-2 to obtain the estimated phase compensation due to the frequency error, and then a complex multiplication of this estimated phase compensation and the initial phase error estimation obtained at the phase error estimation circuit 21B is calculated at the complex multiplier 30-3 to determine the optimum phase compensation. Then, the determined optimum phase compensation is made on the tentatively demodulated signals U at the complex multiplier 30-4, and the demodulated complex signals D are obtained at the decision circuit 32 according to these optimally phase compensated and tentatively demodulated signals U obtained at the complex multiplier 30-4.

Figure 16:
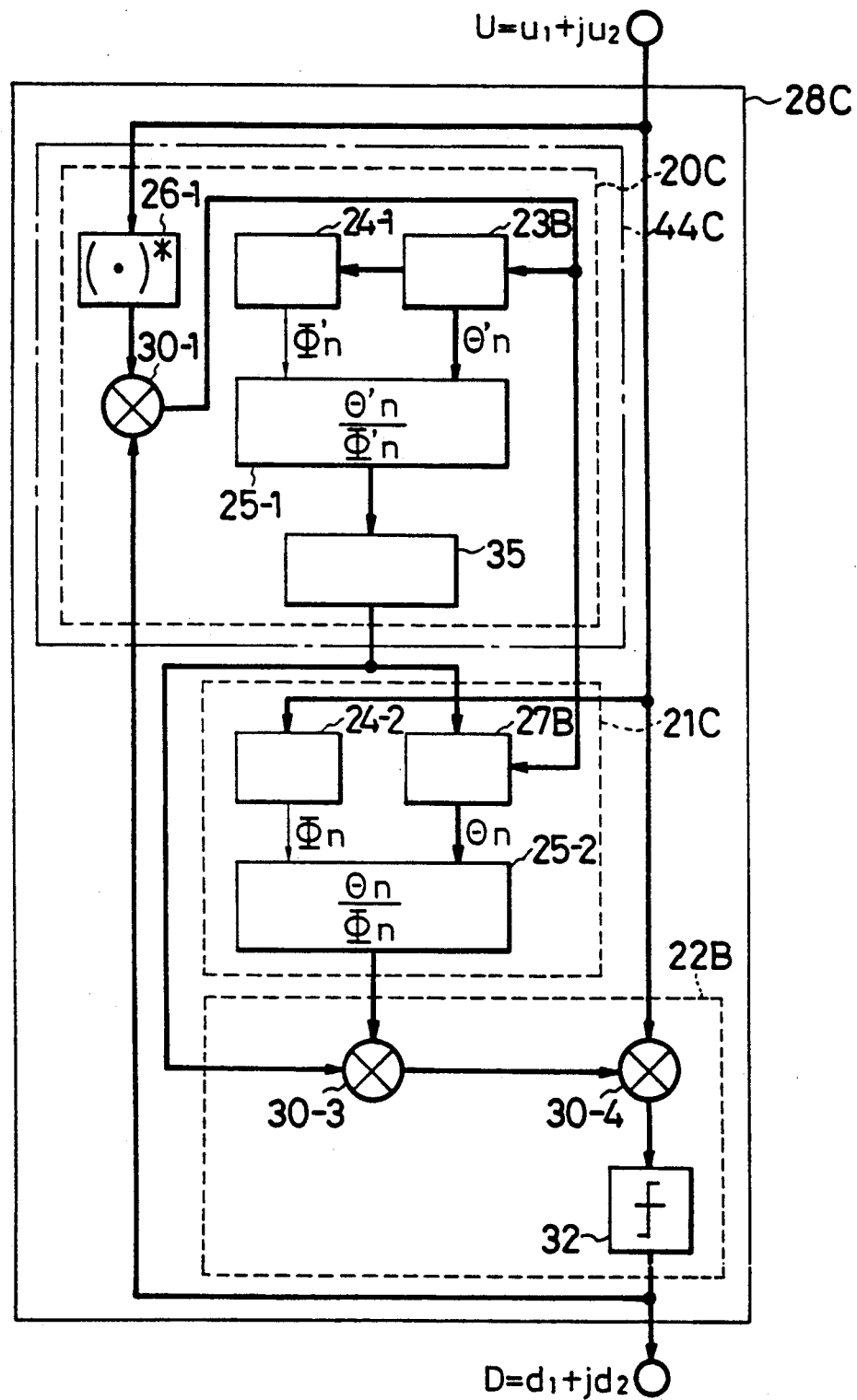
FIG. 16 is a detailed block diagram of a phase control circuit in a third embodiment of an apparatus for demodulation with adaptive phase control in quasi-coherent detection, according to the present invention.

Referring now to FIG. 16, a third embodiment of an apparatus for demodulation with adaptive phase control in quasi-coherent detection according to the present invention will be described in detail. Here, those elements which are substantially equivalent to the corresponding elements in the first embodiment described above will be given the same reference numerals in the figures, and their description will be omitted.

This third embodiment is a modification of the first embodiment described above in which the circuit configuration of the phase control circuit is simplified.

Namely, in this third embodiment, the phase control circuit 28 in the first embodiment is replaced by the phase control circuit 28C shown in FIG. 16 in which the frequency compensation circuit 44C differs from the frequency compensation circuit 44 of the first embodiment by the omission of the involution circuit 29 of the first embodiment.

Figure 17:
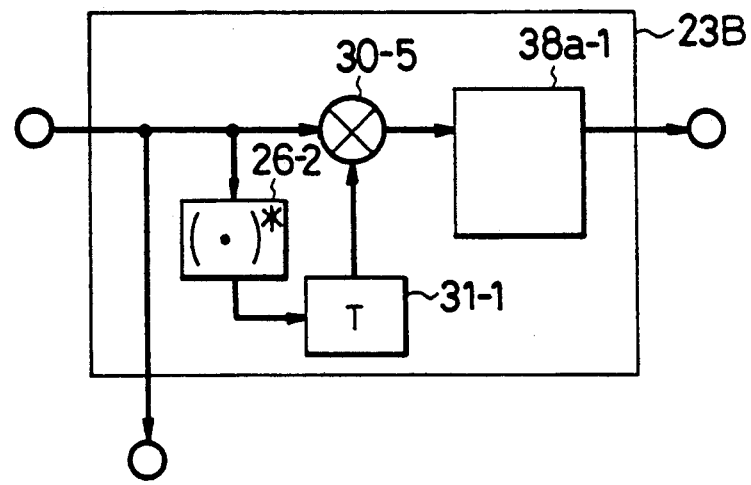
FIG. 17 is a detailed block diagram of a correlation value weighted accumulation circuit in the phase control circuit of FIG. 16.

In addition, the correlation value weighted accumulation circuit 23B has a detailed configuration as shown in FIG. 17 which is different from that shown in FIG. 6 used in the first embodiment by the lack of the complex normalization circuit 35. Instead, the complex normalization circuit 35 is provided after the divider 25-1, such that the output of the divider 25-1 is supplied to the complex normalization circuit 35 alone, while the output of the complex normalization circuit 35 is supplied to the phase error estimation circuit 21 as well as to the complex multiplier 30-3 of the phase equalization circuit 22B.

Figure 18:
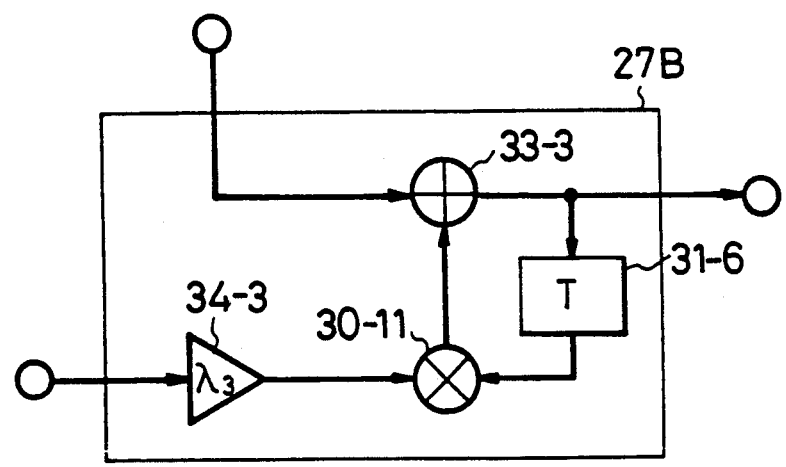
FIG. 18 is a detailed block diagram of a cross correlation value weighted accumulation circuit in the phase control circuit of FIG. 16.

On the other hand, the phase error estimation circuit 21C of this third embodiment differs from the phase error estimation circuit 21 of the first embodiment in that the cross correlation value weighted accumulation circuit 27B has a detailed configuration as shown in FIG. 18 which is different from that shown in FIG. 12 used in the first embodiment as follows.

Namely, in this configuration of FIG. 18, the cross correlation value weighted accumulation circuit 27B comprises: a weight circuit 34-3 for weighting the correlation value outputted from the frequency compensation circuit 44C with the forgetting factor $\lambda_3$, which is similar to the weight circuit 34-1 used in the first embodiment, where $\lambda_3$ may or may not be equal to $\lambda_1$ or $\lambda_2$ used in the frequency compensation circuit 44C; a delay circuit 31-6 for delaying an output of this cross correlation value weighted accumulation circuit 27B for one symbol period; a complex multiplier 30-11 for multiplying the weighted correlation value outputted from the weight circuit 34-3 and the delayed output of the delay circuit 31-6; and an adder 33-3 for adding the correlation value outputted from the complex multiplier 30-1 and the output of the complex multiplier 30-11.

Also, the phase equalization circuit 22B of this third embodiment differs from the phase equalization circuit 22 of the first embodiment in that the complex multiplier 30-2 is omitted, and the complex multiplier 30-3 multiplies the output of the frequency compensation circuit 44C and the phase error estimation circuit 21C.

With this configuration of FIG. 16, the frequency error estimation according to the variation during one symbol in the cross correlation value of the tentatively demodulated signals U and the demodulated complex signals D is obtained by the frequency compensation circuit 44C, just as in the first embodiment. Then, the obtained frequency error estimation is weighted by the forgetting factor $\lambda_3$ for the sake of the phase error estimation, and the exponentially weighted accumulation with the weighted frequency error estimation as the exponential weight is carried out at the cross correlation value weighted accumulation circuit 27B, such that the phase error estimation can be obtained at the divider 25-2. Then, by multiplying this phase error estimation with the frequency error estimation outputted from the frequency compensation circuit 44C as a state transition term at the complex multiplier 30-3, it becomes possible to obtain the accurate phase compensation with the frequency error compensation taken into account, just as in the first embodiment.

In this third embodiment, the circuit configuration of the phase control circuit 28C has a significant simplification in the omission of the involution circuit 29, as well as the reduction of the number of complex multiplication required in the phase equalization circuit 22B, so that this phase control circuit 28C can be realized in a smaller circuit size compared with the phase control circuit 28 of the first embodiment.

Figure 19:
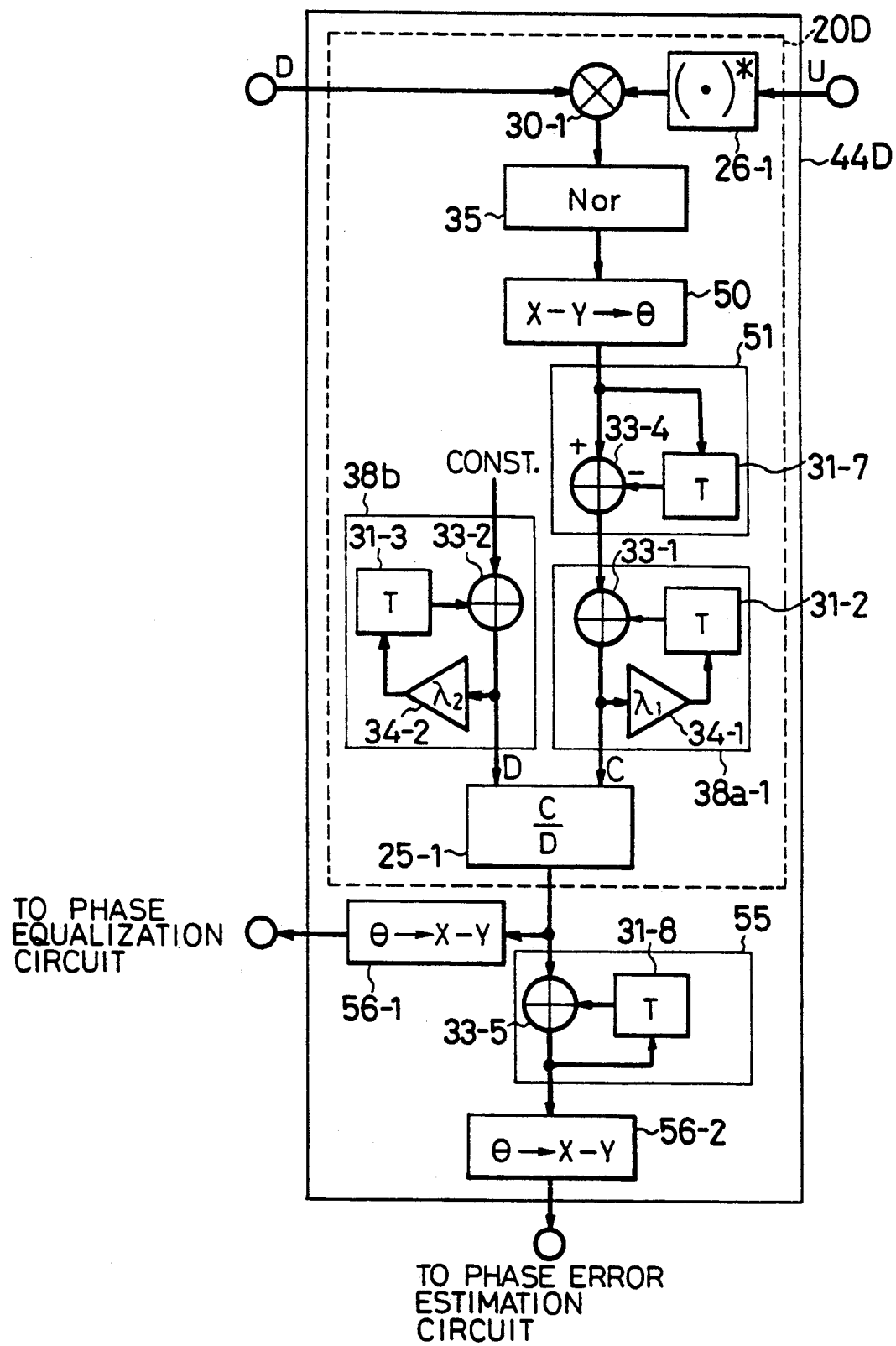
FIG. 19 is a detailed block diagram of a frequency compensation circuit in a phase control circuit, in a fourth embodiment of an apparatus for demodulation with adaptive phase control in quasi-coherent detection, according to the present invention.

Referring now to FIG. 19, a fourth embodiment of an apparatus for demodulation with adaptive phase control in quasi-coherent detection according to the present invention will be described in detail. Here, those elements which are substantially equivalent to the corresponding elements in the first embodiment described above will be given the same reference numerals in the figures, and their description will be omitted.

This fourth embodiment is a modification of the first embodiment described above in which the circuit configuration of the phase control circuit is simplified by realizing the operation in the frequency compensation circuit in terms of polar coordinates.

Namely, in this fourth embodiment, the frequency compensation circuit 44D in the phase control circuit has a detailed configuration as shown in FIG. 19, which differs from the configuration of the frequency compensation circuit 44 shown in FIG. 5 for the first embodiment as follows.

First, the normalized correlation value obtained by the complex normalization circuit 35 is supplied to a phase angle conversion memory circuit 50, which converts the normalized correlation value given in terms of the Cartesian coordinates into the phase angle given in terms of the polar coordinates according to the memorized correspondences between the Cartesian coordinates and the polar coordinates.

Then, the phase angle obtained by the phase angle conversion memory circuit 50 is supplied to an accumulation circuit 51 for obtaining the phase variation during one symbol, which is formed by a delay circuit 31-7 for delaying the phase angle supplied from the phase angle conversion memory circuit 50 for one symbol period, and an adder 33-4 for adding the phase angle supplied from the phase angle conversion memory unit 50 and the delayed phase angle outputted from the delay circuit 31-7. This accumulation circuit 51 replaces the configuration formed by the complex conjugation circuit 26-2, the delay circuit 31-1, and the complex multiplier 30-5 in the configuration shown in FIG. 6. The output of the adder 33-4 is then supplied to the exponentially weighted accumulation circuit 38a-1 similar to that shown in FIG. 7.

On the other hand, instead of the auto correlation value weighted accumulation circuit 24-1 shown in FIG. 9, the exponentially weighted accumulation circuit 38b shown in FIG. 10 alone is used with a constant value equal to 1 entered as an input for the adder 33-2.

Then, the outputs of the exponentially weighted accumulation circuits 38a-1 and 38b are supplied to the divider 25-1, and the output of the divider 25-1 is outputted to an accumulation circuit 55 as well as to the phase equalization circuit 22 through a coordinate conversion memory circuit 56-1.

The accumulation circuit 55 is formed by a delay circuit 31-8 for delaying the output of the divider 25-1 for one symbol period, and an adder 33-5 for adding the output of the divider 25-1 and the delayed output outputted from the delay circuit 31-8. This accumulation circuit 55 replaces the involution circuit 29 shown in FIG. 11 used in the first embodiment. The output of the adder 33-5 is then outputted to the phase error estimation circuit 21 through another coordinate conversion memory circuit 56-2.

The coordinate conversion memory circuits 56-1 and 56-2 converts the signals given in terms of the polar coordinates into signals given in terms of the Cartesian coordinates according to the memorized correspondences between the Cartesian coordinates and the polar coordinates.

In this fourth embodiment, the operation in the frequency compensation circuit 44D shown in FIG. 19 is realized in terms of polar coordinates, so that the number of complex multiplier circuits used in the frequency compensation circuit can be reduced. Consequently, the size of the apparatus can be reduced considerably, because each complex multiplication circuit will occupy a considerably large area on an LSI chip for implementing the apparatus of the present invention.

Figure 20:
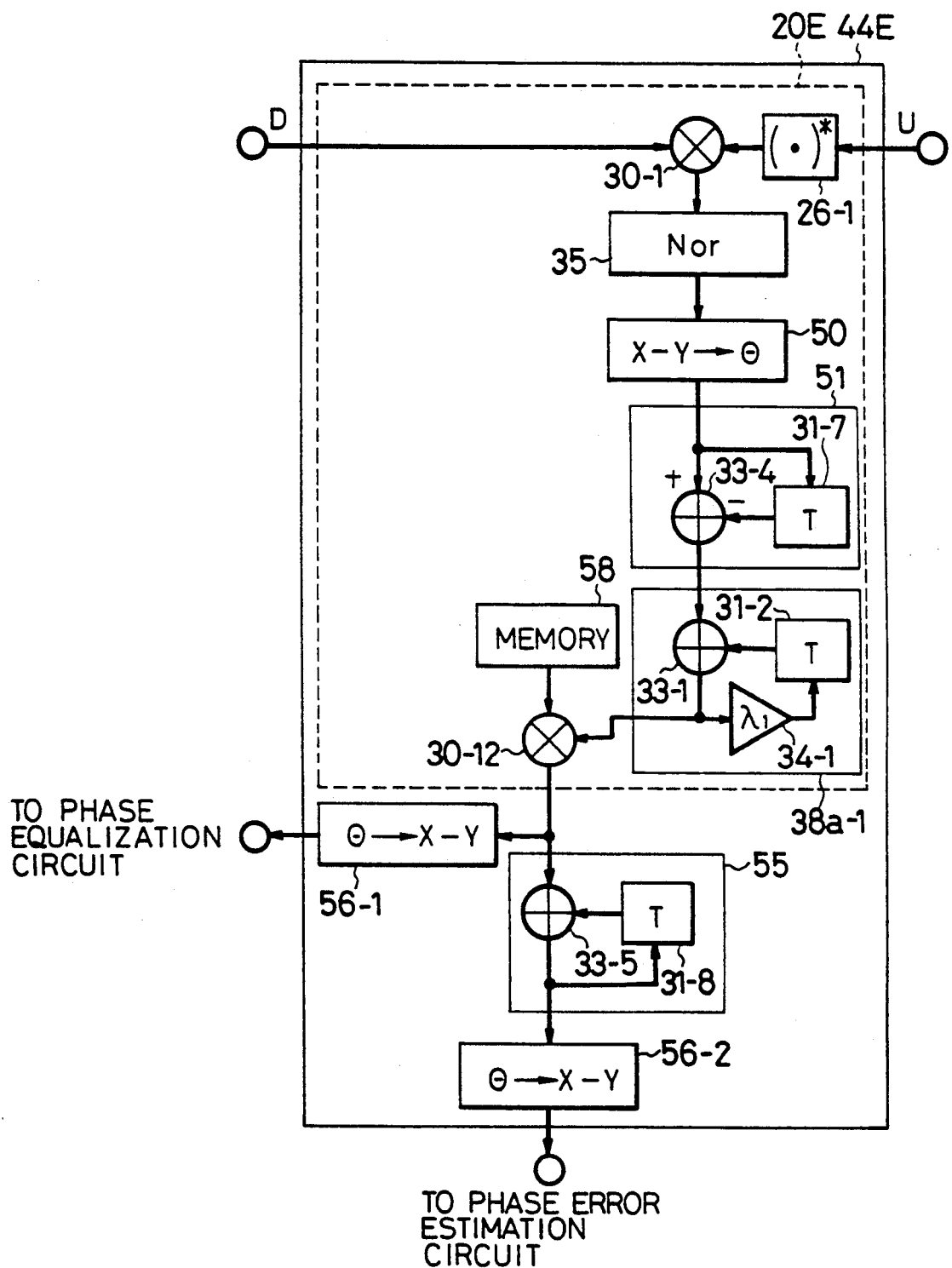
FIG. 20 is a detailed block diagram of a frequency compensation circuit in a phase control circuit, in a fifth embodiment of an apparatus for demodulation with adaptive phase control in quasi-coherent detection, according to the present invention.

Referring now to FIG. 20, a fifth embodiment of an apparatus for demodulation with adaptive phase control in quasi-coherent detection according to the present invention will be described in detail. Here, those elements which are substantially equivalent to the corresponding elements in the first and fourth embodiments described above will be given the same reference numerals in the figures, and their description will be omitted.

This fifth embodiment is a modification of the first embodiment described above in which the circuit configuration of the phase control circuit is simplified by realizing the operation in the frequency compensation circuit in terms of polar coordinates, just as in the fourth embodiment described above.

In this fifth embodiment, the configuration of the frequency compensation circuit 44D of the fourth embodiment shown in FIG. 19 is further modified into the configuration of the frequency compensation circuit 44E shown in FIG. 20, in which the exponentially weighted accumulation circuit 38b in FIG. 19 is replaced by a memory circuit 58 for memorizing inverse values of the values to be produced by the exponentially weighted accumulation circuit 38b in the fourth embodiment, and the divider 25-1 in FIG. 19 is replaced by a complex multiplier 30-12 for calculating a complex multiplication of the outputs of the exponentially weighted accumulation circuit 38a-1 and the memory circuit 58.

The rest of the frequency compensation circuit 44E of this fifth embodiment shown in FIG. 20 is substantially similar to the frequency compensation circuit 44D of the fourth embodiment shown in FIG. 19.

In this fifth embodiment, the configuration of the frequency compensation circuit is further simplified, and consequently, the size of the apparatus can be further reduced, because a divider circuit will occupy an even larger area on an LSI chip for implementing the apparatus of the present invention than the complex multiplier circuit.

As described, according to the present invention, the adaptive phase control is achieved at the phase control circuit by estimating the frequency error according to the variation during one symbol in the cross correlation value of the input of and the output of the phase control circuit, and then estimating the initial phase error according to the frequency error estimation, using a Wiener filter configuration in which the input is weighted by complex weights and a mean square value of a difference between the weighted input and a desired signal is made minimum, where the demodulated complex signals are used as the desired signal in the embodiments described above.

Thus, the method of the present invention significantly differs from the conventionally known methods in that once the correct demodulation signals are obtained, the frequency error can be subsequently estimated accurately by using the recursive estimation algorithm. Consequently, the stationary phase error due to the frequency off-set can be removed completely by carrying out the phase equalization with the phase variation due to the frequency error taken into account, where the frequency error is estimated from the variation in the cross correlation value of the input and the desired signals. As a result, the correct demodulation can be achieved even when the frequency error exists.

Here, by using the estimation algorithm such as RLS algorithm which has a fast initial convergence characteristic for the estimation of the frequency error, it becomes possible to achieve the high speed acquisition even when the frequency error exists. Consequently, the preamble bits to be used in the data transmission can be shortened, such that the utilization efficiency of the frequency bandwidth can be improved.

It is to be noted that the demodulation with adaptive phase control according to the present invention is equally applicable to a demodulation circuit in the TDM (Time Division Multiple) transmission of the burst signals. In particular, the application of the present invention is effective in a case of using a narrower transmission bandwidth at low transmission rate.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of demodulation with adaptive phase control, for obtaining demodulated complex signals from modulated complex input signals, comprising the steps of:

(a) estimating a frequency error in the modulated complex input signals by using a phase variation during one symbol due to the frequency error according to the modulated complex input signals and the demodulated complex signals obtained at the step (c) for present and immediately previous symbols;

(b) estimating an initial phase error in the modulated complex input signals, according to the modulated complex input signals, the demodulated complex signals obtained at the step (c), and the frequency error estimated at the step (a); and (c) obtaining the demodulated complex signals by applying optimum phase compensation determined according to the frequency error estimated at the step (a) and the initial phase error estimated at the step (b), to the modulated complex input signals.

2. The method of claim 1, wherein at the step (a), the frequency error is estimated by using the phase variation during one symbol due to the frequency error obtained as a complex multiplication of cross correlation values for present and immediately previous symbols, each cross correlation value being obtained as a complex multiplication of the modulated complex input signals and the demodulated complex signals.

3. The method of claim 2, wherein at the step (a), the frequency error is estimated by using an ensemble average of the phase variation during one symbol obtained by dividing an exponentially weighted accumulation of the phase variation during one symbol by an exponentially weighted accumulation of an auto correlation value of a complex multiplication of the modulated complex input signals and the demodulated complex signals.

4. The method of claim 1, wherein at the step (a), the frequency error is estimated by using the phase variation during one symbol due to the frequency error obtained as an exponentially weighted accumulation of a difference between a cross correlation value obtained as a complex multiplication of the modulated complex input signals and the demodulated complex signals for an immediately previous symbol and a complex multiplication of the cross correlation value for a present symbol and the exponentially weighted accumulation for the immediately previous symbol.

5. The method of claim 1, wherein the step (a) further comprises the steps of:

(d) estimating the phase variation during one symbol due to the frequency error by using the modulated complex input signals and the demodulated complex signals obtained at the step (c) for present and immediately previous symbols; and (e) estimating a phase compensation required by the frequency error by calculating an involution of the phase variation estimated at the step (d).

6. The method of claim 5, wherein at the step (b), the initial phase error is estimated by using a complex multiplication of the involution calculated at the step (e) and a cross correlation value obtained as a complex multiplication of the modulated complex input signals and the demodulated complex signals.

7. The method of claim 6, wherein at the step (b), the initial phase error is estimated as an ensemble average of the initial phase error by dividing an exponentially weighted accumulation of the complex multiplication of the involution calculated at the step (e) and the cross correlation value obtained as a complex multiplication of the modulated complex input signals and the demodulated complex signals, by an exponentially weighted accumulation of an auto correlation value of the modulated complex input signals.

8. The method of claim 5, wherein at the step (b), the initial phase error is estimated by using an exponentially weighted accumulation of a difference between the demodulated complex signals and a complex multiplication of the exponentially weighted accumulation for an immediately previous symbol and a signal obtained as a complex multiplication of the involution calculated at the step (e) and the modulated complex input signals.

9. The method of claim 5, wherein at the step (c), the optimum phase compensation is applied by calculating a first complex multiplication of the involution calculated at the step (e) and the phase variation estimated at the step (d), a second complex multiplication of the initial phase error estimated at the step (b) and the first complex multiplication, and a third complex multiplication of the modulated complex input signals and the second complex multiplication.

10. The method of claim 1, wherein at the steps (a) and (b), the frequency error and the initial phase error are estimated by using RLS (Recursive Least Square) algorithm.

11. The method of claim 1, wherein at the steps (a) and (b), the frequency error and the initial phase error are estimated by using LMS (Least Mean Square) algorithm.

12. The method of claim 1, wherein at the step (b), the initial phase error is estimated by using a complex addition of a cross correlation value obtained as a complex multiplication of the modulated complex input signals and the demodulated complex signals with a complex multiplication of the frequency error for a present symbol estimated at the step (a) weighted by a forgetting factor and the complex addition for an immediately previous symbol.

13. The method of claim 12, wherein at the step (b), the initial phase error is estimated as an ensemble average of the initial phase error by dividing the complex addition by an exponentially weighted accumulation of an auto correlation value of the modulated complex input signals.

14. The method of claim 12, wherein at the step (c), the optimum phase compensation is applied by calculating a first complex multiplication of the frequency error estimated at the step (a) and the initial phase error estimated at the step (b), and a second complex multiplication of the modulated complex input signals and the first complex multiplication.

15. The method of claim 1, wherein at the step (a), the frequency error is estimated in terms of polar coordinates and the estimated frequency error is outputted in terms of Cartesian coordinates.

16. The method of claim 15, wherein at the step (a), the frequency error is estimated by using the phase variation during one symbol due to the frequency error obtained as a complex addition of cross correlation values given in the polar coordinates for present and immediately previous symbols, each cross correlation value being obtained as a complex multiplication of the modulated complex input signals and the demodulated complex signals.

17. The method of claim 16, wherein at the step (a), the frequency error is estimated by using an ensemble average of the phase variation during one symbol by dividing an exponentially weighted accumulation of the phase variation during one symbol by an exponentially weighted accumulation of a constant value.

18. The method of claim 16, wherein at the step (a), the frequency error is estimated by using an ensemble average of the phase variation during one symbol by multiplying an exponentially weighted accumulation of the phase variation during one symbol by a predetermined inverse of an exponentially weighted accumulation of a constant value.

19. The method of claim 15, wherein the step (a) further comprises the steps of:
 (d) estimating the phase variation during one symbol due to the frequency error in terms of the polar coordinates by using the modulated complex input signals and the demodulated complex signals obtained at the step (c) for present and immediately previous symbols; and
 (e) estimating a phase compensation required by the frequency error by calculating a complex addition of the phase variation estimated in terms of the polar coordinates at the step (d) for present and immediately previous symbols.

20. The method of claim 1, further comprising the steps of:
 (a') initially estimating a frequency error in the modulated complex input signals by using a phase variation during one symbol due to the frequency error according to the modulated complex input signals and predetermined training signals for present and immediately previous symbols, before the step (a) is carried out;
 (b') initially estimating an initial phase error in the modulated complex input signals, according to the modulated complex input signals, the predetermined training signals, and the frequency error estimated at the step (a'), before the step (b) is carried out; and
 (c') initially obtaining the demodulated complex signals by applying optimum phase compensation determined according to the frequency error estimated at the step (a') and the initial phase error estimated at the step (b'), to the modulated complex input signals, before the step (c) is carried out.

21. An apparatus for demodulation with adaptive phase control, for obtaining demodulated complex signals from modulated complex input signals, comprising:
 (a) means for estimating a frequency error in the modulated complex input signals by using a phase variation during one symbol due to the frequency error according to the modulated complex input signals and the demodulated complex signals obtained by the means (c) for present and immediately previous symbols;
 (b) means for estimating an initial phase error in the modulated complex input signals, according to the modulated complex input signals, the demodulated complex signals obtained by said means (c), and the frequency error estimated by said means (a); and
 (c) means for obtaining the demodulated complex signals by applying optimum phase compensation determined according to the frequency error estimated by said means (a) and the initial phase error estimated by said means (b), to the modulated complex input signals.

22. The apparatus of claim 21, wherein said means (a) estimates the frequency error by using the phase variation during one symbol due to the frequency error obtained as a complex multiplication of cross correlation values for present and immediately previous symbols, each cross correlation value being obtained as a complex multiplication of the modulated complex input signals and the demodulated complex signals.

23. The apparatus of claim 22, wherein said means (a) estimates the frequency error by using an ensemble average of the phase variation during one symbol by dividing an exponentially weighted accumulation of the phase variation during one symbol by an exponentially weighted accumulation of an auto correlation value of a complex multiplication of the modulated complex input signals and the demodulated complex signals.

24. The apparatus of claim 21, wherein said means (a) estimates the frequency error by using the phase variation during one symbol due to the frequency error obtained as an exponentially weighted accumulation of a difference between a cross correlation value obtained as a complex multiplication of the modulated complex input signals and the demodulated complex signals for an immediately previous symbol and a complex multiplication of the cross correlation value for a present symbol and the exponentially weighted accumulation for the immediately previous symbol.

25. The apparatus of claim 21, wherein said means (a) further comprises:
 (d) means for estimating the phase variation during one symbol due to the frequency error by using the modulated complex input signals and the demodulated complex signals obtained by said means (c) for present and immediately previous symbols; and
 (e) means for estimating a phase compensation required by the frequency error by calculating an involution of the phase variation estimated by said means (d).

26. The apparatus of claim 25, wherein said means (b) estimates the initial phase error by using a complex multiplication of the involution calculated by said means (e) and a cross correlation value obtained as a complex multiplication of the modulated complex input signals and the demodulated complex signals.

27. The apparatus of claim 26, wherein said means (b) estimates the initial phase error as an ensemble average of the initial phase error by dividing an exponentially weighted accumulation of the complex multiplication of the involution calculated by said means (e) and the cross correlation value obtained as a complex multiplication of the modulated complex input signals and the demodulated complex signals, by an exponentially weighted accumulation of an auto correlation value of the modulated complex input signals.

28. The apparatus of claim 25, wherein said means (b) estimates the initial phase error by using an exponentially weighted accumulation of a difference between the demodulated complex signals and a complex multiplication of the exponentially weighted accumulation for an immediately previous symbol and a signal obtained as a complex multiplication of the involution calculated by said means (e) and the modulated complex input signals.

29. The apparatus of claim 25, wherein said means (c) applies the optimum phase compensation by calculating a first complex multiplication of the involution calculated by said means (e) and the phase variation estimated by said means (d), a second complex multiplication of the initial phase error estimated by said means (b) and the first complex multiplication, and a third complex multiplication of the modulated complex input signals and the second complex multiplication.

30. The apparatus of claim 21, wherein said means (a) and (b) estimate the frequency error and the initial phase error by using RLS (Recursive Least Square) algorithm.

31. The apparatus of claim 21, wherein said means (a) and (b) estimate the frequency error and the initial phase error by using LMS (Least Mean Square) algorithm.

32. The apparatus of claim 21, wherein said means (b) estimates the initial phase error by using a complex addition of a cross correlation value obtained as a complex multiplication of the modulated complex input signals and the demodulated complex signals with a complex multiplication of the frequency error for a present symbol estimated by said means (a) weighted by a forgetting factor and the complex addition for an immediately previous symbol.

33. The apparatus of claim 32, wherein said means (b) estimates the initial phase error as an ensemble average of the initial phase error by dividing the complex addition by an exponentially weighted accumulation of an auto correlation valye of the modulated complex input signals.

34. The apparatus of claim 32, wherein said means (c) applies the optimum phase compensation by calculating a first complex multiplication of the frequency error estimated by said means (a) and the initial phase error estimated by said means (b), and a second complex multiplication of the modulated complex input signals and the first complex multiplication.

35. The apparatus of claim 21, wherein said means (a) estimates the frequency error in terms of polar coordinates and outputs the estimated frequency error in terms of Cartesian coordinates.

36. The apparatus of claim 35, wherein said means (a) estimates the frequency error by using the phase variation during one symbol due to the frequency error obtained as a complex addition of cross correlation values given in the polar coordinates for present and immediately previous symbols, each cross correlation value being obtained as a complex multiplication of the modulated complex input signals and the demodulated complex signals.

37. The apparatus of claim 36, wherein said means (a) estimates the frequency error by using an ensemble average of the phase variation during one symbol by dividing an exponentially weighted accumulation of the phase variation during one symbol by an exponentially weighted accumulation of a constant value.

38. The apparatus of claim 36, wherein said means (a) estimates the frequency error by using an ensemble average of the phase variation during one symbol by multiplying an exponentially weighted accumulation of the phase variation during one symbol by a predetermined inverse of an exponentially weighted accumulation of a constant value.

39. The apparatus of claim 35, wherein said means (a) further comprises:
(d) means for estimating the phase variation during one symbol due to the frequency error in terms of the polar coordinates by using the modulated complex input signals and the demodulated complex signals obtained by said means (c) for present and immediately previous symbols; and
(e) means for estimating a phase compensation required by the frequency error by calculating a complex addition of the phase variation estimated in terms of the polar coordinates by said means (d) for present and immediately previous symbols.

40. The apparatus of claim 21, wherein said means (a) initially estimates a frequency error in the modulated complex input signals by using a phase variation during one symbol due to the frequency error according to the modulated complex input signals and predetermined training signals for present and immediately previous symbols; said means (b) initially estimates an initial phase error in the modulated complex input signals, according to the modulated complex input signals, the predetermined training signals, and the frequency error estimated by said means (a); and said means (c) initially obtains the demodulated complex signals by applying optimum phase compensation determined according to the frequency error initially estimated by said means (a0 and the initial phase error initially estimated by said means (b), to the modulated complex input signals.

* * * * *